(12) United States Patent
O'Brien, II

(10) Patent No.: US 8,360,222 B2
(45) Date of Patent: Jan. 29, 2013

(54) TRANSMISSION BRAKING AND FOUR-WHEEL LOCKING FOR HYDRAULIC HYBRID TRANSMISSION EQUIPPED VEHICLES

(75) Inventor: James A. O'Brien, II, La Salle, MI (US)

(73) Assignee: Limo-Reid, Inc., Deerfield, MI (US)

( * ) Notice: Subject to any disclaimer, the term of this patent is extended or adjusted under 35 U.S.C. 154(b) by 673 days.

(21) Appl. No.: 12/538,958

(22) Filed: Aug. 11, 2009

(65) Prior Publication Data

US 2010/0038204 A1  Feb. 18, 2010

(51) Int. Cl.
*B60T 1/06* (2006.01)
*B60K 17/356* (2006.01)

(52) U.S. Cl. ............. 192/219.4; 192/221; 180/307; 60/435

(58) Field of Classification Search ............ 192/219.4, 192/219.5; 60/435
See application file for complete search history.

(56) References Cited

U.S. PATENT DOCUMENTS

| | | | | |
|---|---|---|---|---|
| 3,610,004 A | * | 10/1971 | Neese | 70/248 |
| 3,638,772 A | * | 2/1972 | Ninomiya | 192/221 |
| 5,495,912 A | * | 3/1996 | Gray et al. | 180/165 |

* cited by examiner

*Primary Examiner* — Richard M. Lorence
(74) *Attorney, Agent, or Firm* — Fraser Clemens; Martin & Miller LLC; William J. Clemens

(57) ABSTRACT

A transmission braking system includes a vehicle drive train and at least one hydraulic motor. The hydraulic motor includes a front shaft and a rear shaft. The rear shaft has an anti-rotation element. An engagement mechanism is slidably affixed to the vehicle drive train, and selectively couples with the anti-rotation element to militate against a rotation of the front and rear shafts. A four-wheel locking system is also provided. The four wheel locking system includes a shaft-coupling engagement mechanism slidably affixed to one of the hydraulic motors. The shaft-coupling engagement mechanism selectively couples with the anti-rotation elements of the motors for allowing a summing of the output torque. The transmission braking system and the four-wheel locking system may be provided in a combined system.

14 Claims, 3 Drawing Sheets

TRANSMISSION BRAKING AND FOUR-WHEEL LOCKING FOR HYDRAULIC HYBRID TRANSMISSION EQUIPPED VEHICLES

CROSS-REFERENCE TO RELATED APPLICATIONS

This application claims the benefit of U.S. Provisional Application No. 61/088,161, filed on Aug. 12, 2008. The entire disclosure of the above application is hereby incorporated herein by reference.

FIELD OF THE INVENTION

The present disclosure relates generally to safety and performance enhancements for vehicles equipped with hydraulic hybrid transmissions.

BACKGROUND OF THE INVENTION

All entities that consume large amounts of gasoline, diesel, and related fuels have been greatly impacted by a significant increase in cost. Furthermore, due to worldwide unrest and increased worldwide demand, inflationary costs will continue to drive up the cost of energy. To combat these ever increasing costs, many entities are adopting new technologies such as hybrid propulsion systems to lower or control these dramatic cost increases.

1. Hydraulic Hybrid Transmissions:

A hydraulic hybrid power train system typically includes: a power plant generating a high pressure fluid at an output; at least one drive motor responsive to the high pressure fluid for generating rotary motion at an output; and a mode selection device connected to the power plant output and the drive motor. The mode selection device selects a mode of operation from a plurality of drive motor modes of operation, including at least two of a drive mode, a neutral mode, a reverse mode and a park mode. The system includes a control device connected to the power plant and the drive motor for controlling operation of the drive motor in the plurality of modes of operation. The system further includes a selectively actuated brake device for interrupting high pressure fluid flow to the drive motor, and a check valve bridge circuit for connecting the drive motor to a low pressure fluid source when the brake device is actuated.

For the current disclosure, one known aspect of the design of note is the park mode. As currently practiced for hydraulic hybrid transmissions, park mode changes the position of one or more hydraulic valves to prevent oil flow from conduits that lead to the one or more drive motors. In this manner, oil is prevented from reaching the motors, thereby limiting their ability to rotate.

Another known aspect of the design is the configuration of the drive-line components of the system. As currently practiced, the front and rear drive components of hydraulic hybrid transmission equipped vehicles are mechanically independent of one another.

2. Transmission Brakes in the Present State of the Art:

Many modern vehicles with automatic transmissions provide two independent means for preventing the vehicle from moving when it is parked. The independent means include: a transmission brake and a parking brake (also sometimes referred to as an emergency brake). The former is used to prevent the transmission, and therefore the vehicle's driven wheels, from rotating. The latter is typically only applied to the vehicle's rear wheels. As such, having both of these devices provides an additional degree of safety since each, individually, is subject to a variety of failure modes. For example, in certain environments, parking brakes can fail without warning (for example, due to debris collecting between mating surfaces), causing the vehicle to move unexpectedly. Thus, having a transmission brake in addition to the parking brake can militate against accidents from occurring.

Compared to the complexity of an automatic transmission, the means for implementing a transmission brake is quite straight-forward. As shown in FIG. 1, the transmission brake mechanism 100 is implemented with a series of notches 102 on the outside of a clutch housing 104 and a single or pair of spring-loaded catches 106. To engage the transmission brake mechanism 100, an actuator 108 simply moves the catch 106 radially inwardly into one of the notches 102 to prevent the clutch housing from rotating.

Vehicles with hybrid hydraulic power trains are similar to traditional vehicles in that it is necessary to provide some means for ensuring that the vehicle stays stationary when parked. However, the means for providing a transmission lock, such as that shown in FIG. 1, cannot be applied because the transmission does not have a clutch housing.

One approach for providing a transmission braking capability is to essentially "do nothing". Knowing that hydraulic fluid is essentially incompressible and that the hydraulic pump is coupled to the engine, when the vehicle's engine is turned off, the amount of torque that would be required to back-drive the system should be sufficiently great that the vehicle should not move. There are two flaws with this approach, however. First, many hydraulic hybrid vehicles are designed to capture braking energy, which is essentially back-driving the system. As such, the amount of torque to back-drive the system is not significantly large. In addition, some hydraulic hybrid vehicles use the hydraulic motor to start the engine. Thus, if the vehicle were to slip, this motion could potentially start the engine, which would create an extremely dangerous situation. Second, most hydraulic components are designed to leak, referred to as a case drain, and is caused by bypassing oil that is required to keep the component lubricated. The leakage rate for motors typically employed is approximately 1.1 lit/min at full system pressure and less than one-tenth that at minimum system pressure. When the vehicle is parked, system pressure is typically quite low, however, an external load applied to the motors acts to increase pressure, thereby increasing the leakage rate. Actual experience with hybrid hydraulic transmission equipped vehicles has shown that when parked on a 20 percent grade, the vehicle moves approximately 2 cm/min. While this very slow rate of movement is not perceptible, over extended periods of time, the distance travelled can become large enough to cause potentially dangerous situations to arise.

There are numerous embodiments of transmission brakes for traditional automatic transmission-equipped vehicles known to those skilled in the art. However, since those cannot be applied to hydraulic hybrid transmission-equipped vehicles, a review of prior patents is not provided herein.

3. Four-Wheel Locking in the Present State of the Art:

Four-wheel drive is employed to increase the vehicle's available traction, thereby allowing it to negotiate terrain that might not otherwise be possible. There is a wide variety of four-wheel drive systems available for standard (non-hybrid) vehicles. The first distinction typically recognized is "four-wheel drive" versus "all-wheel drive". The former usually refers to a part-time system for which the driver specifically commands the change from two-wheel to four-wheel drive. Such systems are almost exclusively engaged for use in low-traction conditions, such as off-road driving. The latter refers to a full-time system that cannot be switched on and off. Such systems are used in a wide range of applications. Within the context of the current disclosure, four-wheel, i.e., part-time, drive systems are the more closely related of the two.

Four-wheel drive systems are comprised of two differentials (one located between the front wheels, the other between the rear wheels) and a transfer case. The differentials send torque to each of the wheels while allowing them to spin at different speeds. The transfer case locks the front and rear drive shafts (also referred to as a prop shaft) together, thereby allowing the engine's torque to be applied to all four wheels.

FIG. 2 shows a simple drawing of a vehicle drive train 200 for a vehicle having a known four-wheel drive system. The four-wheel drive system includes a transfer case 202, a rear drive shaft 204, a rear differential 206, a front drive shaft 208, a front differential 210, a half shaft 212, and a plurality of locking hubs 214 connected to the vehicle's wheels. Each of the components of the vehicle is connected as shown, and thereby forms the vehicle drive train 200.

These four-wheel drive systems, however, do have a weakness. Often, an open differential is employed to evenly divide the torque evenly between each of the two wheels to which it is connected. If one of those two wheels loses traction, the torque applied to that wheel drops to zero. Because the torque is split evenly, this means that the other wheel also receives zero torque. Thus, even if the other wheel has plenty of traction, no torque is transferred to it. A limited slip differential partially alleviates this problem by applying some torque to each wheel regardless of conditions.

Several hydraulic hybrid transmission equipped vehicles provide an all-wheel drive capability. With respect to FIG. 2, these vehicles eliminate the transfer case 202, replace the drives shafts 204, 208 with hydraulic lines, and add hydraulic motors immediately before the differentials 206, 210. In this manner, torque can be applied to all four wheels at all times. However, this vehicle transmission does not address the problem described.

To minimize vehicle weight, simplify component packaging, maximize operating efficiency, and minimize cost, the hydraulic motors on a hydraulic hybrid transmission equipped vehicles are sized to handle only slightly more than half of the total power that can be delivered by the hydraulic system. Considering the situation in which both of the front wheels have limited traction, the hydraulic motor that powers the front wheels will consume some oil (which would spin the front wheels but not provide any motive power) and the hydraulic motor that powers the rear wheels would consume as much oil as possible. The problem is that the amount of power, and thereby torque, being applied to the rear wheels is only half of the total power available.

SUMMARY OF THE INVENTION

In concordance with the instant disclosure, a transmission brake and a four-wheel drive coupling mechanism for use on hydraulic hybrid transmission equipped vehicles, is surprisingly discovered.

To provide a transmission brake capability, a shaft brake is added to the hydraulic motor. By locking the motor shaft from rotating with respect to the vehicle, the flaws identified previously are addressed. This approach prevents at least one of the wheels attached to the locked motor from turning, and does so in a manner that is completely independent of the parking brake. As such, this approach provides the desired system redundancy, thereby improving the safety of the hybrid hydraulic power train equipped vehicles.

In one embodiment, a transmission braking system includes a vehicle drive train and at least one hydraulic motor. The hydraulic motor includes a front shaft and a rear shaft. The front shaft is connected to the vehicle drive train The rear shaft has an anti-rotation element. An engagement mechanism is slidably affixed to the vehicle drive train, and selectively couples with the anti-rotation element to militate against a rotation of the front and rear shafts.

For example, a disk with a series of notches is secured to the rear shaft of the hydraulic drive motor. An actuator-driven, spring-loaded pawl, sized to fit snugly between adjacent notches, is used to militate against the shaft rotating when engaged. In other examples, a sliding collar is used to militate against the motor shaft rotating.

This arrangement of components addresses the lack of transmission braking capability associated with prior art hydraulic hybrid transmission equipped vehicles previously identified. The system is sized such that the transmission brake can secure the vehicle when it is parked on a steep grade such as a sixty percent (60%) grade. Operation of the transmission brake is automatic in the sense that the brake engages when the driver shifts the vehicle into a "Park" mode and is disengaged when the driver shifts the vehicle out of the "Park" mode.

In another embodiment, a four-wheel locking system includes a vehicle drive train and a pair of hydraulic motors including a front shaft and a rear shaft, each of the rear shafts having an anti-rotation element. A shaft-coupling engagement mechanism is slidably affixed to one of the hydraulic motors, and selectively couples with the anti-rotation elements of the motors. The shaft-coupling engagement mechanism allows a summing of output torque of the hydraulic motors.

It should be appreciated that there are at least two advantages where the two hydraulic motors are mechanically coupled. First, all of the power in the system is directed to the wheels that have sufficient traction, because the output power from both motors will be coupled. Second, because the motors are coupled, the speed of the tractionless wheels will be the same as the driving wheels, thereby minimizing the possibility that the free-spinning wheels will dig in.

One method for affecting the coupling is to employ the rear shafts from the two hydraulic motors and join them together using a operator-controlled clutch (in much the same manner that drivers of vehicles equipped with standard transmission currently select four-wheel drive mode).

In a further embodiment, a combined transmission brake and four-wheel locking system includes a vehicle drive train and a pair of hydraulic motors. Each of the hydraulic motors includes a front shaft and a rear shaft. Each of the rear shafts has a rear shaft anti-rotation element. A first engagement mechanism is slidably affixed to one of the hydraulic motors, and selectively couples with the rear shaft anti-rotation elements of the motors for allowing a summing of output torque of the hydraulic motors. The shaft-coupling engagement mechanism further includes a shaft-coupling anti-rotation element. A second engagement mechanism is slidably affixed to the vehicle drive train and selectively couples with the slidable shaft-coupling anti-rotation element to militate against a rotation of the front and rear shafts.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

Figure 1:
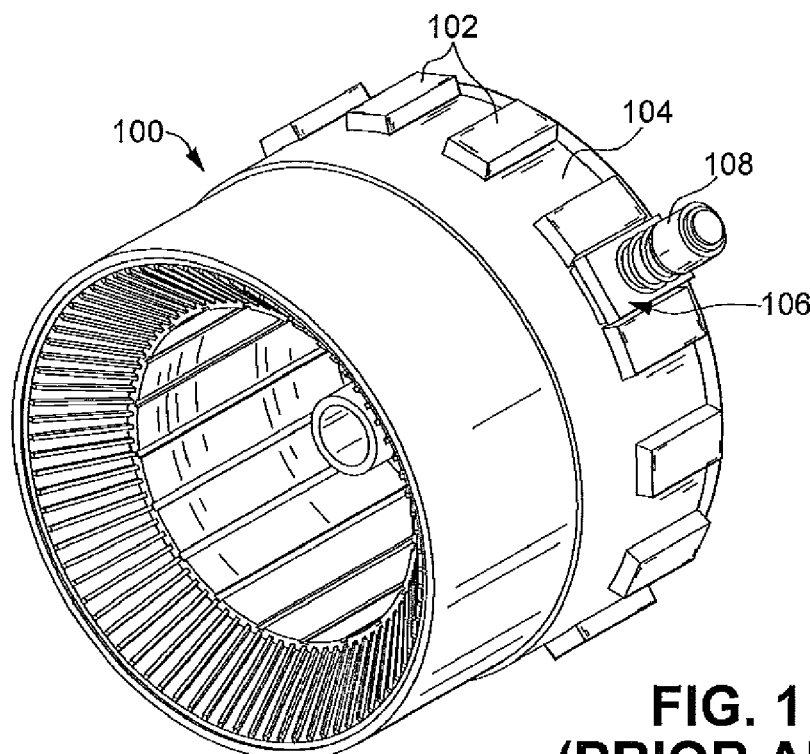
FIG. 1 shows a perspective view of an automatic transmission of the prior art, showing a transmission parking feature.
Figure 2:
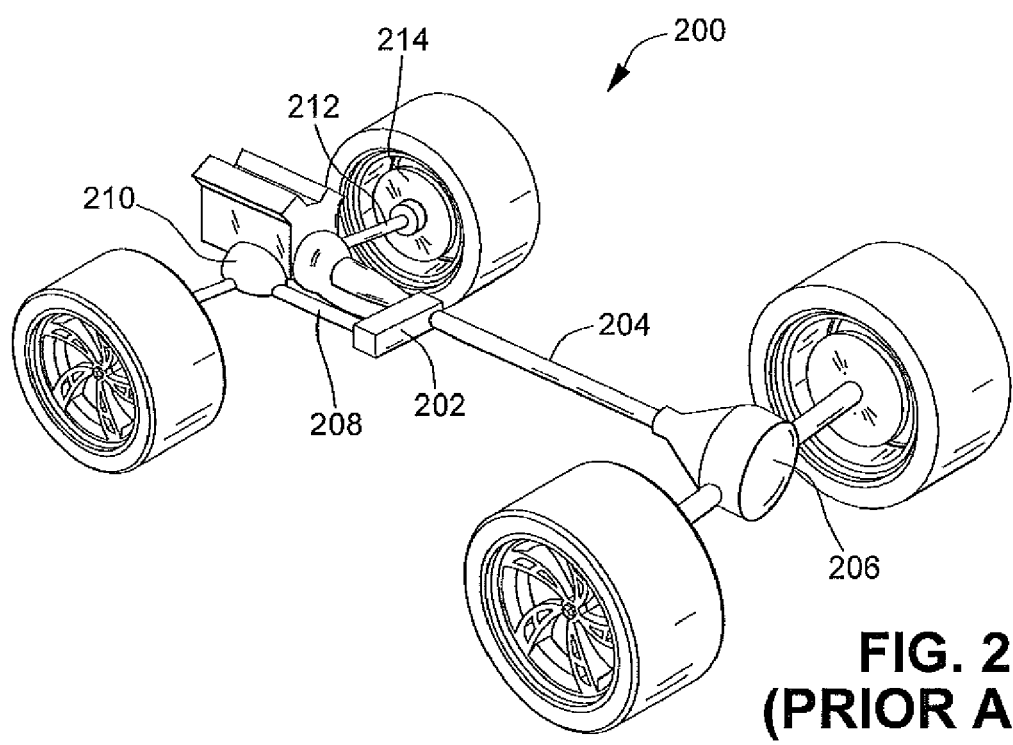
FIG. 2 shows a schematic, perspective representation of a four-wheel drive equipped vehicle of the prior art.
Figure 3:
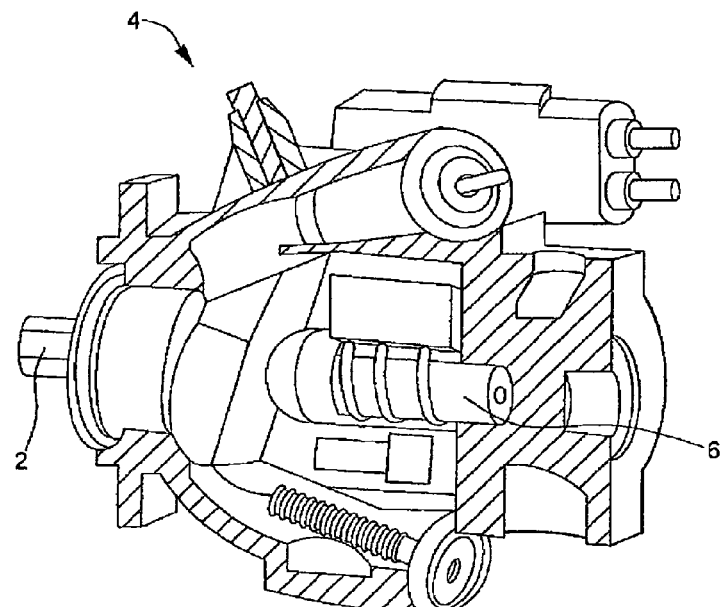
FIG. 3 shows a cross-sectional, perspective view of a hydraulic motor according to one embodiment of the present disclosure.

The following description is merely exemplary in nature and is not intended to limit the present disclosure, application, or uses. It should also be understood that throughout the drawings, corresponding reference numerals indicate like or corresponding parts and features.

Referring to FIGS. 3-7, a transmission brake in accordance with the current disclosure is generally shown. In one embodiment, the disclosure includes a hydraulic motor 4 with a front shaft 2 and a rear shaft 6. The front shaft 2 is coupled to the components of the vehicle drive train 200, such as at least one of the rear and front drive shafts 204, 208 or one or more of the wheels, for example.

Figure 4:
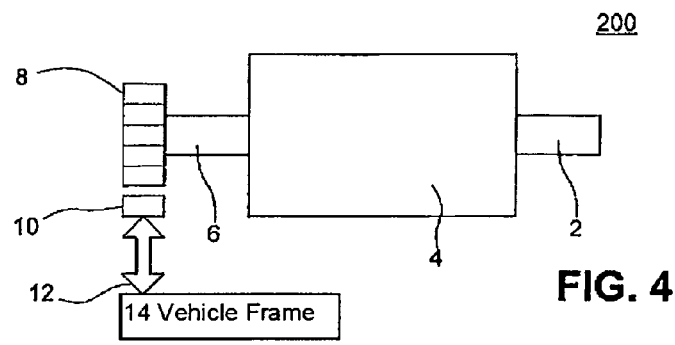
FIG. 4 shows a schematic view of a pawl/notch embodiment of a transmission brake for a hydraulic hybrid transmission.

With reference to FIG. 4, the rear shaft 6 may include a series of equally spaced notches 8 around the circumference of the rear shaft 6. The notches 8 can be provided by means of an anti-rotation element or component, such as a disk separate from the rear shaft 6 and rigidly attached to the rear shaft 6. In another example, the anti-rotation element or component may be directly incorporated into, or integral with, the rear shaft 6. The anti-rotation element may include a dry-friction clutch, for example. Where the anti-rotation element includes a non-round feature, the transmission brake may include an engagement mechanism having a corresponding mating feature, for example. In one embodiment, an engagement mechanism such as a pawl 10 is sized to fit snugly or tightly within one of the notches 8. The disk with the notches 8 and the pawl 10 are sufficiently large to withstand the load of the vehicle when parked on a steep incline.

The pawl 10 is attached to a device 12 that moves the pawl 10 such that the pawl 10 selectively either engages or does not engage one of the notches 8. The device 12 is rigidly affixed to a portion of a frame 14 of the vehicle, such that the device 12 can slide to effect the engagement of the pawl 10 with the notches 8, but cannot otherwise move with respect to the frame 14. The device 12 may be any of a mechanical, electrical, or hydraulic actuator, or combination thereof, having a disposition that is controlled by the driver of the vehicle via the engagement of the "Park" mode.

Figure 5:
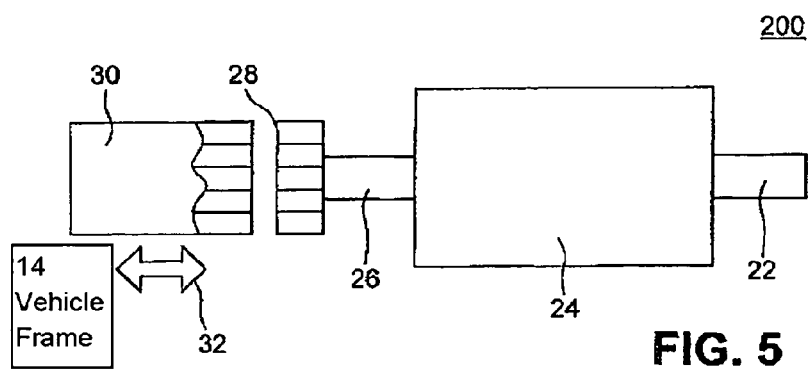
FIG. 5 shows a schematic view of a sliding collar embodiment of a transmission brake for a hydraulic hybrid transmission, having a cut-out showing internal corresponding notches.
Figure 6:
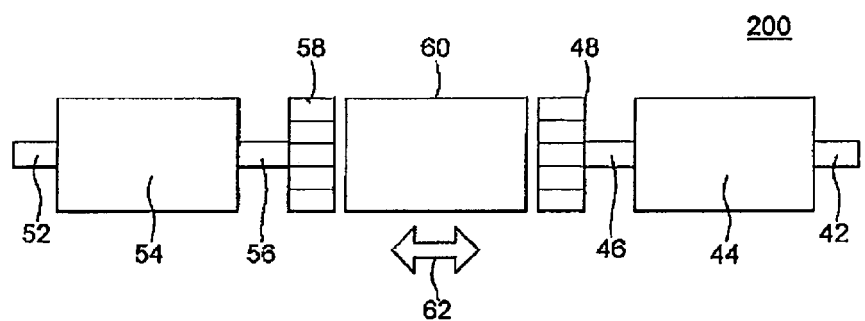
FIG. 6 shows a schematic view of an other sliding collar embodiment of a four-wheel drive for a hydraulic hybrid transmission.
Figure 7:
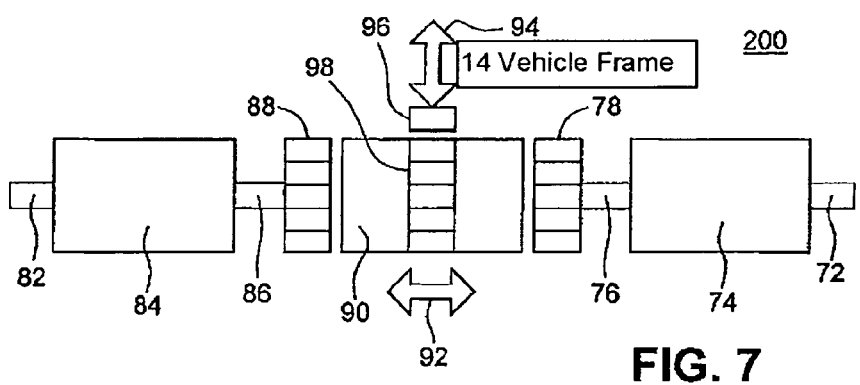
FIG. 7 shows a schematic view of a further sliding collar embodiment of a combined transmission brake and four-wheel drive for a hydraulic hybrid transmission.

FIGS. 5-7 show transmission brakes according to other embodiments of the disclosure. Like structure from FIGS. 1-4 are shown with the same reference numerals with an additional preceding numeral, for purpose of clarity.

Referring to FIG. 5, a transmission brake in accordance with one embodiment of the current disclosure is generally shown. The transmission brake includes a hydraulic motor 24 with a front shaft 22 and a rear shaft 26. The front shaft 22 is coupled to the components of the vehicle drive train 200, such as at least one of the rear and front drive shafts 204, 208 or one or more of the wheels.

The rear shaft 26 includes a feature 28 that supports torsional loading. The feature 28 may have a square profile, a gear profile, or any other profile known to support torsional loading. The feature 28 can be provided by means of a component, such as the disk, separate from rear shaft 26 and rigidly attached to the rear shaft 26. In another example, the feature 28 may be directly incorporated into and integral with the rear shaft 26. A sliding collar 30 is sized to fit snugly around feature 28. The feature 28 and sliding collar 30 are sufficiently large to withstand the load of the vehicle when parked on a steep incline.

The sliding collar 30 is attached to a device 32 that moves the sliding collar 30 such that the sliding collar 30 either engages or does not engage the feature 28. The device 32 is rigidly affixed to a portion of the frame 14 of the vehicle such that the device 32 can slide, but not rotate, with respect to the frame 14. The device 32 may be any of a mechanical, electrical, or hydraulic actuator, or combination thereof, having a disposition that is controlled by the driver of the vehicle via the engagement of the "Park" mode.

In other embodiments, the sliding collar 30 and the feature 28 can be replaced with friction pads to effect the same functionality as described herein.

Referring to FIG. 6, a four-wheel drive in accordance with the current disclosure is generally shown. The four-wheel drive includes a front hydraulic motor 44 with a front shaft 42 and a rear shaft 46, and a rear motor 54 with a front shaft 52 and a rear shaft 56. The front shafts 42, 52 are coupled to the components of the vehicle drive train 200, such as at least one of the rear and front drive shafts 204, 208 or one or more of the wheels of the vehicle, for example.

The rear shafts 46, 56 include features 48, 58 that support torsional loading. The features 48, 58, which need not be identical, may be a square profile, a gear profile, or any other profile known to support torsional loading. The features 48, 58 can be provided by means of a component separate, such as the disk, from the rear shafts 46, 56 and rigidly attached to the rear shafts 46, 56. Alternatively, the features 48, 58 may be directly incorporated into, and integral with, the rear shafts 46, 56. A sliding collar 60 is sized to fit snugly around features 48, 58. The features 48, 58 and the sliding collar 60 are sufficiently large to withstand the maximum torque that can be provided by the hydraulic system.

The sliding collar 60 is attached to a device 62 that moves the sliding collar 60 such that the sliding collar 60 selectively either engages or does not engage the feature 48, 58. The device 62 may be affixed to either of the rear shafts 46, 56, for example. The device 62 allows the summing of the output torque of the hydraulic motors 44, 54. The device 62 may be any of a mechanical, electrical, or hydraulic actuator, or combination thereof having a disposition that is controlled by the driver of the vehicle.

The sliding collar 60 and the features 48, 58 can be replaced with friction pads to effect the same functionality as described herein.

Referring to FIG. 7, a combined transmission brake and four-wheel drive in accordance with the current disclosure is generally shown. The combined transmission brake and four-wheel drive includes a front hydraulic motor 74 with a front shaft 72 and a rear shaft 76, and a rear motor 84 with a front shaft 82 and a rear shaft 86. The front shafts 72, 82 are coupled to the components of the vehicle drive train 200, such as at least one of the rear and front drive shafts 204, 208 or one or more of the wheels.

The rear shafts 76, 86 include the features 78, 88 that support torsional loading. The features 78, 88, which need not be identical, may be a square profile, a gear profile, or any other profile known to support torsional loading. The features 78, 88 can provided by means of a component, such as the disk, separate from rear shafts 76, 86 and rigidly attached to the rear shafts 76, 86. The features 78, 88 may alternatively be directly incorporated into, and integral with, the rear shafts 76, 86. A sliding collar 90 is sized to fit snugly around features 78, 88. The features 78, 88 and sliding collar 90 are sufficiently large to withstand the maximum torque that can be provided by the hydraulic system.

The sliding collar 90 is attached to a device 92 that moves the sliding collar 90 such that the sliding collar 90 either engages or does not engage the features 78, 88. The device 92 may be affixed to either of the rear shafts 76, 86, for example. The device 92 may be any of a mechanical, electrical, or hydraulic actuator, or combination thereof, having a disposition that is controlled by the driver of the vehicle.

The sliding collar 90 also includes a series of equally spaced notches or features 98 that supports torsional loading around the circumference of the collar 90. A pawl or collar 96 is sized to fit snugly within one of the notches 98, or slidably engage the feature 98. The sliding collar 90 with the notches 98 and pawl 96 are sufficiently large to withstand the load of the vehicle when parked on a steep incline.

The pawl or collar 96 is attached to a device 94 that moves the pawl 96 such that the pawl 96 either engages or does not engage the notches 98 or the feature 98. The device 94 is rigidly affixed to a portion of a frame 14 of the vehicle such that the device 94 can slide to effect the engagement of the pawl or collar 96 with the notches 98, but cannot otherwise move with respect to the frame 14. The device 94 may be any of a mechanical, electrical, or hydraulic actuator, or combination thereof, having a disposition that is controlled by the driver of the vehicle via the engagement of the "Park" mode. The operation of the braking functionality, embodied in the device 94, the pawl or collar 96, and the notches or features 98, can be operated regardless of the status of the shaft locking functionality embodied in the features 78, 88, the collar 90, and the device 92. Specifically, the braking functionality applies to one of the motors 74, 84 when the four-wheel drive coupling is disengaged, and to both of the motors 74, 84 when the coupling is engaged.

It should be appreciated that the sliding collar 90 and the features 78, 88 can be replaced with friction pads to effect the same functionality as described hereinabove. The pawl or collar 98 and the notches or features 96 can also be replaced with friction pads to effect the same functionality as previously described.

While certain representative embodiments and details have been shown for purposes of illustrating the invention, it will be apparent to those skilled in the art that various changes may be made without departing from the scope of the disclosure, which is further described in the following appended claims.

What is claimed is:

1. A transmission braking system, comprising:
a vehicle drive train;
at least one hydraulic motor, including a front shaft and a rear shaft, the front shaft connected to the vehicle drive train, the rear shaft having an anti-rotation element; and
an engagement mechanism slidably affixed to a vehicle frame which selectively couples with the anti-rotation element and militates against a rotation of the front and rear shafts, said engagement mechanism including a sliding collar for coupling with the anti-rotation element.

2. The transmission braking system of claim 1, wherein the anti-rotation element is a non-round feature and the engagement mechanism includes a corresponding mating feature.

3. The transmission braking system of claim 1, wherein the engagement mechanism is one of mechanically, pneumatically, electrically, or hydraulically actuated.

4. A four-wheel locking system, comprising:
a vehicle drive train;
a pair of hydraulic motors each including a front shaft and a rear shaft, at least one of the front shafts connected to the vehicle drive train, each of the rear shafts having an anti-rotation element; and
a shaft-coupling engagement mechanism slidably affixed to one of the hydraulic motors which selectively couples with the anti-rotation elements of the motors for allowing a summing of output torque of the hydraulic motors.

5. The four-wheel locking system of claim 4, wherein anti-rotation element is a notched disk and the shaft-coupling engagement mechanism includes a sliding collar sized to fit snugly with the notched disk.

6. The transmission braking system of claim 5, wherein the shaft-coupling engagement mechanism includes a device that is affixed to one of the rear shafts of one of the motors.

7. The transmission braking system of claim 6, wherein the device can slide the sliding collar to effect the engagement of the sliding collar with the notched disk.

8. The four-wheel locking system of claim 4, wherein the shaft-coupling engagement mechanism is one of mechanically, pneumatically, electrically, or hydraulically actuated.

9. A combined transmission brake and four-wheel locking system, comprising: a vehicle drive train;
a pair of hydraulic motors each including a front shaft and a rear shaft, at least one of the front shafts connected to the vehicle drive train, each of the rear shafts having a rear shaft anti-rotation element;
a first engagement mechanism slidably affixed to one of the hydraulic motors which selectively couples with the rear shaft anti-rotation elements of the motors for allowing a summing of output torque of the hydraulic motors, wherein the first engagement mechanism further includes a shaft-coupling anti-rotation element; and
a second engagement mechanism slidably affixed to a vehicle frame which selectively couples with the slidable shaft-coupling anti-rotation element and militates against a rotation of the front and rear shafts.

10. The combined transmission brake and four-wheel locking system of claim 9, wherein the rear shaft anti-rotation element is a notched disk and the first engagement mechanism includes a sliding collar sized to fit snugly with the notched disk.

11. The combined transmission brake and four-wheeling locking system of claim 10, wherein the first engagement mechanism includes a device that can slide to effect the engagement of the sliding collar with the notched disk.

12. The combined transmission brake and four-wheel locking system of claim 11, wherein the first engagement mechanism includes a plurality of notches formed therein, and the second engagement mechanism includes a pawl sized to fit snugly within at least one of the notches.

13. The combined transmission brake and four-wheel locking system of claim 12, wherein the second engagement mechanism includes a device that can slide to effect the engagement of the pawl with the notches formed in the first engagement mechanism.

14. The combined transmission brake and four-wheel locking system of claim 9, wherein each of the first engagement mechanism and the second engagement mechanism is one of mechanically, pneumatically, electrically, or hydraulically actuated.

* * * * *